(12) United States Patent
Sugiyama et al.

(10) Patent No.: US 11,003,162 B2
(45) Date of Patent: May 11, 2021

(54) DATA COLLECTION DEVICE

(71) Applicant: FANUC CORPORATION, Yamanashi (JP)

(72) Inventors: Kazuyuki Sugiyama, Yamanashi (JP); Junichi Tezuka, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 45 days.

(21) Appl. No.: 16/197,812

(22) Filed: Nov. 21, 2018

(65) Prior Publication Data

US 2019/0187666 A1 Jun. 20, 2019

(30) Foreign Application Priority Data

Dec. 18, 2017 (JP) .............................. JP2017-242058

(51) Int. Cl.
*G05B 19/4065* (2006.01)
(52) U.S. Cl.
CPC .............. *G05B 19/4065* (2013.01); *G05B 2219/50203* (2013.01)
(58) Field of Classification Search
CPC ................................................ G05B 19/4065
USPC .......................................................... 700/175
See application file for complete search history.

(56) References Cited

U.S. PATENT DOCUMENTS

| 2012/0254350 | A1* | 10/2012 | Ito | H04L 67/125 |
| | | | | 709/217 |
| 2016/0291576 | A1* | 10/2016 | Nakamura | G05B 19/4063 |
| 2016/0299488 | A1* | 10/2016 | Ogawa | G05B 19/4065 |

FOREIGN PATENT DOCUMENTS

| JP | 2001-22419 | 1/2001 |
| JP | 2007-164284 | 6/2007 |
| JP | 2007-328431 | 12/2007 |
| JP | 2011-48583 | 3/2011 |

(Continued)

OTHER PUBLICATIONS

Kerrisk, editor; Linux Man-Page for "inode", May 2017, retrieved from https://web.archive.org/web/20170506024407/http://man7.org/linux/man-pages/man7/inode.7.html on Mar. 30, 2020 (Year: 2017).*

(Continued)

*Primary Examiner* — Mohammad Ali
*Assistant Examiner* — Joshua T Sanders
(74) *Attorney, Agent, or Firm* — Wenderoth, Lind & Ponack, L.L.P.

(57) ABSTRACT

A data collection device capable of reducing the load of a data collection process and network communication by monitoring trigger at a plurality of cycles is provided. The data collection device includes a control unit, and the control unit includes: an event monitoring unit that acquires first trigger information from the machine tool at a first cycle and monitors whether a starting condition and an ending condition for acquisition of the data have been established on the basis of the first trigger information; a sampling control unit that instructs the machine tool to sample the data at a second cycle shorter than the first cycle when the starting condition is established and instructs the machine tool to end the sampling when the ending condition is established; and a data acquisition unit that acquires the data sampled by the machine tool from the machine tool together with second trigger information.

8 Claims, 6 Drawing Sheets

(56) References Cited

FOREIGN PATENT DOCUMENTS

| JP | 2012-205278 | 10/2012 |
| JP | 2015-179365 | 10/2015 |
| JP | 2016-91179 | 5/2016 |
| JP | 2016-200894 | 12/2016 |
| WO | 2015/092853 | 12/2013 |

OTHER PUBLICATIONS

Notification of Reasons for Refusal dated Oct. 29, 2019 in the Japanese Patent Application No. 2017-242058.
Decision of Refusal issued in corresponding JP Patent Application No. 2017-242058, dated Feb. 4, 2020.

* cited by examiner

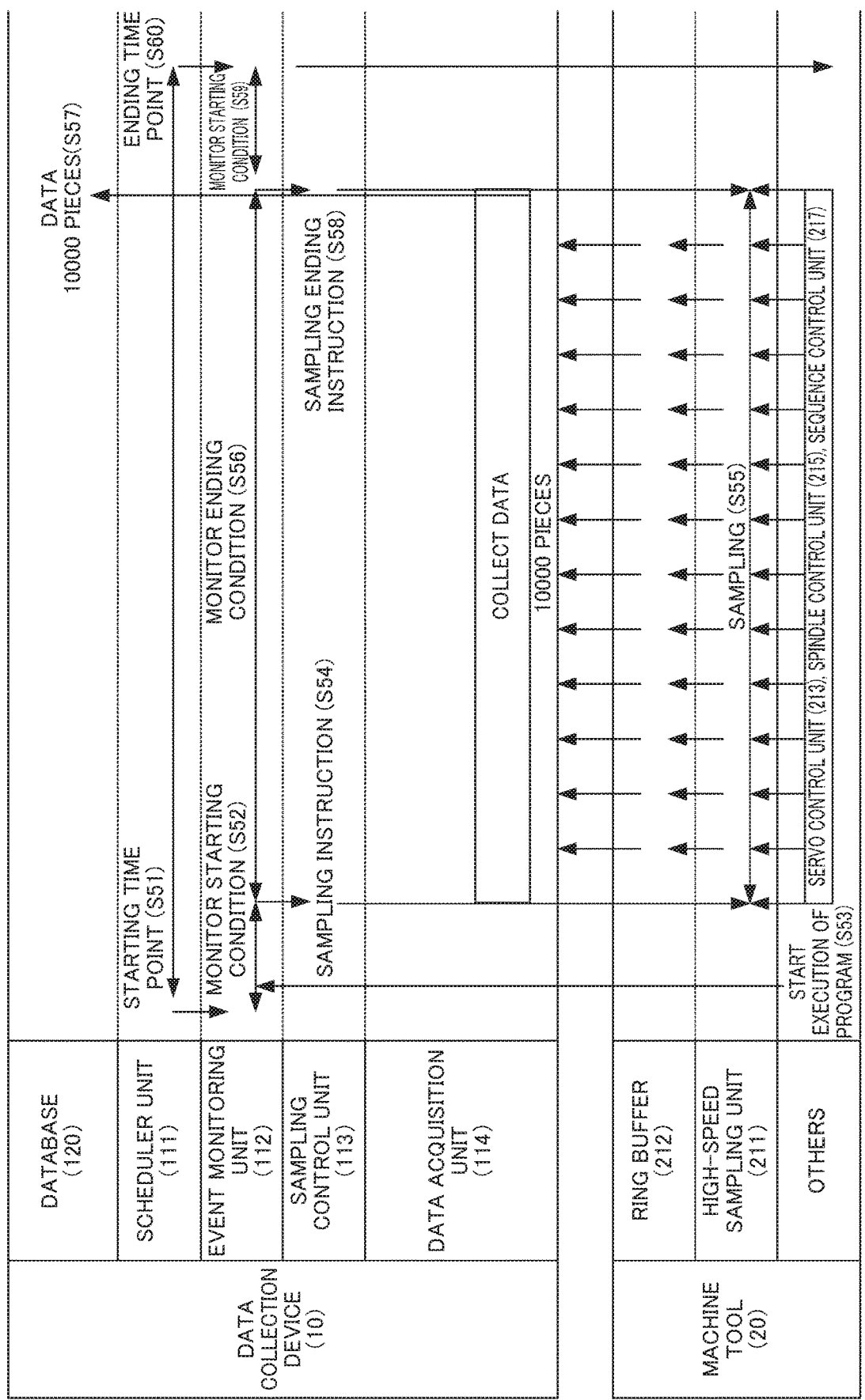

DATA COLLECTION DEVICE

This application is based on and claims the benefit of priority from Japanese Patent Application No. 2017-242058, filed on 18 Dec. 2017, the content of which is incorporated herein by reference.

BACKGROUND OF THE INVENTION

Field of the Invention

The present invention relates to a data collection device.

Related Art

Conventionally, a technology of operating an industrial machine such as a machine tool to collect measurement data related to the state and the like of the industrial machine in operation has been performed.

The measurement data collected in this manner can be used for finding out a sign or the like of deterioration or failures of components occurring due to aging, for example.

The measurement data is transmitted from a numerical controller that controls the machine tool or a numerical control unit included in the machine tool to a host device via a network such as a local area network (LAN) installed in a plant.

In this regard, Patent Document 1 discloses a controller including a servo control processor that controls a servo motor of a machine or the like to process at least one piece of information among the position, the speed, and the torque of the servo motor, in which the servo control processor receives signals obtained by A/D converting analog signals measured by a measurement target circuit of a machine or the like, appends internal information such as the position, the speed, or the torque to the signals, and displays the signals on a display as a graph.

Moreover, Patent Document 2 discloses a data observation device that observes internal data of a controller that controls a machine tool, an industrial machine, or an industrial robot including at least one servo motor or one spindle motor, the data observation device including means for designating trigger data used for determining a trigger timing of starting and/or ending acquisition of observation data, means for determining whether trigger conditions for applying a trigger are satisfied on the basis of the value of the trigger data, and means for displaying the acquired observation data, in which the data observation device can designate a plurality of pieces of trigger data used as the trigger conditions.

Patent Document 1: Japanese Unexamined Patent Application, Publication No. 2001-22419
Patent Document 2: Japanese Unexamined Patent Application, Publication No. 2007-328431

SUMMARY OF THE INVENTION

However, the invention disclosed in Patent Document 1 stores individual pieces of data sampled at a plurality of cycles in a shared memory, and has a problem that, when data is sampled at a high-speed cycle, the load of a data collection process and network communication increases.

The invention disclosed in Patent Document 2 does not discuss the load when data is sampled at a high-speed cycle.

An object of the present invention is to provide a data collection device capable of reducing the load of a data collection process and network communication and collecting data reliably without skipping portions where data measurement is necessary by using a combination of a first trigger determination unit that determines starting/ending of high-speed sampling at a low-speed cycle and a second trigger determination unit that determines the storage of high-speed sampling data.

(1) A data collection device of the present invention is a data collection device (for example, a data collection device 10 to be described later) that collects data from a machine tool (for example, a machine tool 20 to be described later), including: a control unit (for example, a control unit 110 to be described later), wherein the control unit includes: an event monitoring unit (for example, an event monitoring unit 112 to be described later) that acquires first trigger information from the machine tool at a first cycle and monitors whether a starting condition and an ending condition for acquisition of the data have been established on the basis of the first trigger information; a sampling control unit (for example, a sampling control unit 113 to be described later) that instructs the machine tool to start sampling the data at a second cycle shorter than the first cycle when the starting condition is established and instructs the machine tool to end the sampling when the ending condition is established; and a data acquisition unit (for example, a data acquisition unit 114 to be described later) that acquires the data sampled by the machine tool from the machine tool together with second trigger information.

(2) The data collection device according to (1) may further include a database (for example, a database 120 to be described later), and the data acquisition unit (for example, a data acquisition unit 114 to be described later) may monitor whether a storage condition for the data is established on the basis of the second trigger information, store the data in the database when the storage condition is established, and end the storage of the data when the storage condition is not established.

(3) In the data collection device according to (1) or (2), a plurality of starting conditions may be present, the event monitoring unit (for example, an event monitoring unit 112 to be described later) may monitor the plurality of starting conditions simultaneously, and the sampling control unit (for example, a sampling control unit 113 to be described later) may instruct the machine tool to sample data of a type corresponding to the established starting condition.

(4) In the data collection device according to any one of (1) to (3), the first cycle may be 500 ms to 1 s and the second cycle may be 1 ms to 10 ms.

(5) In the data collection device according to any one of (1) to (4), the first trigger information may be information related to at least one of a program number and/or a program name of a program being executed by the machine tool (for example, a machine tool 20 to be described later), a tool number being used by the machine tool, and a variable (hereinafter referred to as a macro variable) designated in the program and used for control.

(6) In the data collection device according to any one of (1) to (5), the second trigger information may be information related to at least one of a sequence number included in a program being executed by the machine tool (for example, a machine tool 20 to be described later), a sequence signal (also referred to as a programmable machine controller, hereinafter referred to as a PMC signal) on which sequence control is performed, and an alarm from the machine tool.

(7) In the data collection device according to any one of (1) to (6), the data acquisition unit (for example, a data acquisition unit 114 to be described later) may acquire a data set including the data from the machine tool (for example, a machine tool 20 to be described later) and store the data set in a buffer included in the data acquisition unit.

(8) In the data collection device according to (7), the data set may have a data structure including data size information, the second trigger information, and sampling data corresponding to one cycle.

(9) In the data collection device according to any one of (1) to (8), the control unit (for example, a control unit 110 to be described later) may further include: a scheduler unit (for example, a scheduler unit 111 to be described later) that sets a starting time point and an ending time point for an operation of the event monitoring unit (for example, an event monitoring unit 112 to be described later), operates the event monitoring unit when a present time point matches the starting time point, and ends the operation of the event monitoring unit when the present time point matches the ending time point.

According to the present invention, it is possible to provide a data collection device capable of reducing the load of a data collection process and network communication and collecting data reliably without skipping portions where data measurement is necessary by using a combination of a first trigger determination unit that determines starting/ending of high-speed sampling at a low-speed cycle and a second trigger determination unit that determines the storage of high-speed sampling data.

BRIEF DESCRIPTION OF THE DRAWINGS

FIG. 6 is a diagram illustrating an operation of the data collection system according to the embodiment of the present invention.

DETAILED DESCRIPTION OF THE INVENTION

Hereinafter, an embodiment of the present invention will be described with reference to FIGS. 1 to 4.

1. Configuration of Invention

Figure 1:
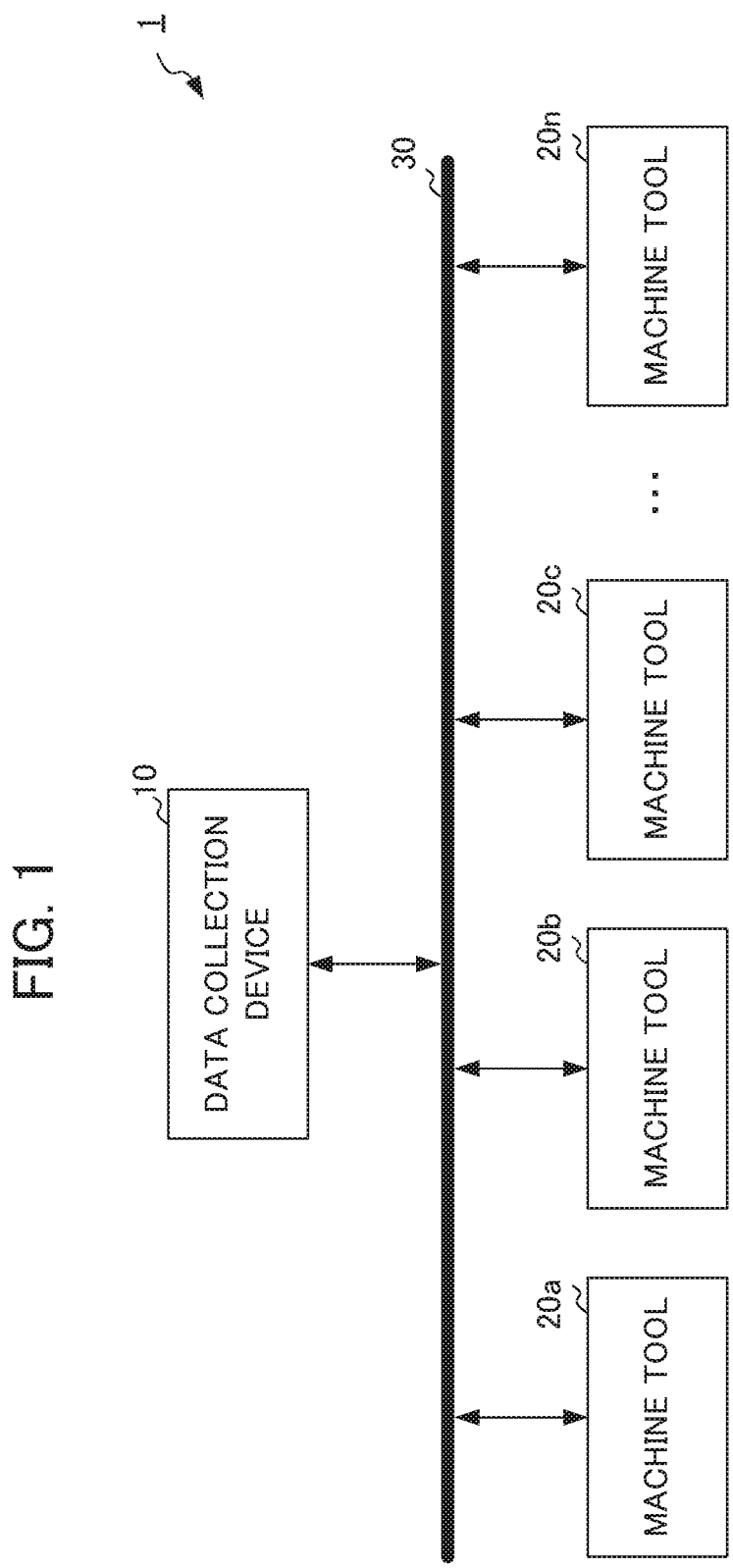
FIG. 1 is a diagram illustrating an entire configuration of a data collection system according to an embodiment of the present invention.

FIG. 1 illustrates an entire configuration of a data collection system 1 according to an embodiment.

As illustrated in FIG. 1, the data collection system 1 includes a data collection device 10, n machine tools 20 (machine tools 20*a* to 20*n*), and a network 30.

Here, n is an arbitrary natural number.

The data collection device 10 is a device for collecting measurement data from the machine tool 20 via the network 30. The measurement data collected by the data collection device 10 is data indicating a physical amount related to the position, the speed, the acceleration, and the torque of a drive shaft of the machine tool 20, for example.

The measurement data is measured by various sensors provided in the machine tool 20 and various sensors provided around the machine tool 20.

Examples of various sensors include a rotary encoder or a linear encoder for calculating the position of a drive shaft, a current meter for measuring a current flowing through a motor, an acceleration sensor for measuring a vibration applied to a drive shaft, and a temperature sensor for detecting overheat of a drive shaft.

The machine tool 20 is a device that performs a predetermined machining operation such as cutting.

The machine tool 20 includes a motor that is driven to process a work, a spindle and a feed axis attached to the motor, and jigs and tools corresponding to these axes.

The machine tool 20 performs a predetermined machining operation by driving the motor on the basis of an operation command.

Here, the content of the predetermined machining operation is not particularly limited, and beside the cutting, other machining operations such as, for example, grinding, polishing, rolling, or forging may be performed.

Moreover, the machining operation may involve machining of a work and may not involve machining of a work.

The present embodiment can be applied broadly to overall industrial machine.

An industrial machine is various machines such as, for example, a machine tool, an industrial robot, or a service robot.

Moreover, the industrial machine does not need to be particularly unique to the present embodiment but can be realized by an ordinary industrial machine.

The data collection device 10 and the machine tool 20 are communicably connected via the network 30.

Here, the network 30 is realized by a network such as a local area network (LAN) laid out in a plant.

Figure 2:
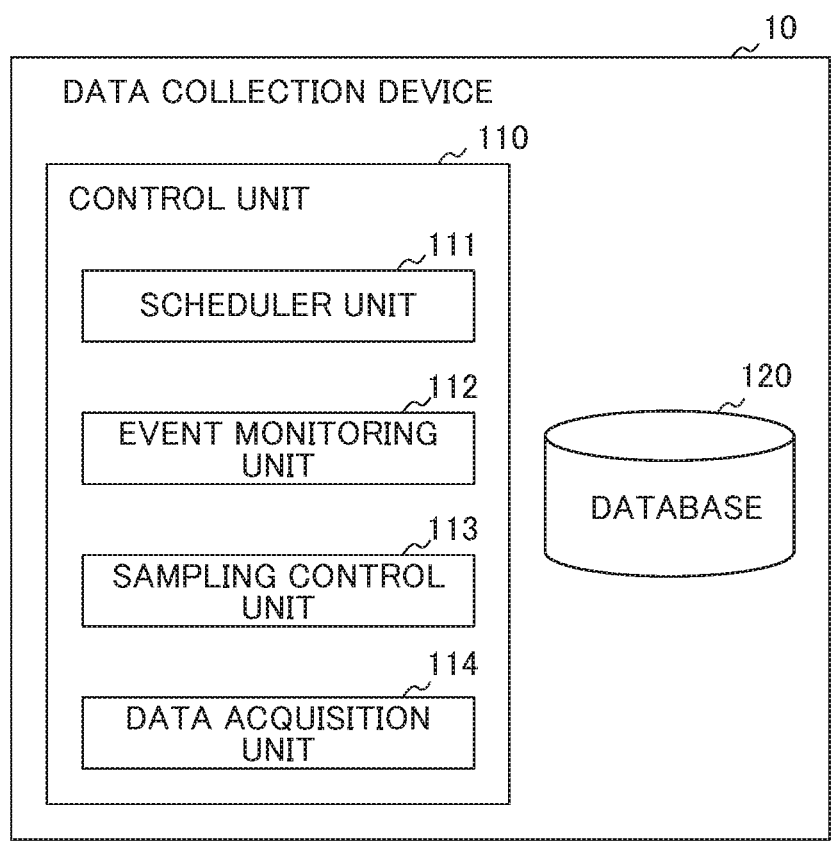
FIG. 2 is a functional block diagram of a data collection device according to an embodiment of the present invention.

FIG. 2 is a functional block diagram of the data collection device 10.

The data collection device 10 includes a control unit 110 and a database 120.

The control unit 110 is one which is known to a skilled person in the art and includes a CPU, a ROM, a RAM, a CMOS memory, and the like and in which these components are communicable via a bus.

The CPU is a processor that controls the entire data collection device 10.

The CPU reads a system program and an application program stored in the ROM via a bus and controls the entire data collection device 10 according to the system program and the application program so that, as illustrated in FIG. 2, the control unit 110 realizes the functions of a scheduler unit 111, an event monitoring unit 112, a sampling control unit 113, and a data acquisition unit 114.

The scheduler unit 111 sets the starting and ending time points of a data monitoring and collection process.

Furthermore, the scheduler unit 111 includes a clock unit (not illustrated), starts a data monitoring and collection process when a present time point measured by the clock unit matches the starting time point set by itself, and ends the data monitoring and collection process when the present time point matches the ending time point set by itself.

More specifically, the scheduler unit 111 sets starting and ending time points of an operation of the event monitoring unit 112 to be described later, starts the operation of the event monitoring unit 112 when the present time point matches the starting time point, and ends the operation of the event monitoring unit 112 when the present time point matches the ending time point.

The event monitoring unit 112 acquires first trigger information from the machine tool 20 at a first cycle and monitors whether the starting condition and the ending condition for acquisition of data by the data acquisition unit 114 are established on the basis of the first trigger information.

Particularly, the event monitoring unit 112 monitors a plurality of starting conditions simultaneously, and when it is determined that one starting condition is established, suspends monitoring of other starting conditions, and monitors an ending condition corresponding to the established starting condition.

This monitoring is referred to as "low-speed trigger monitoring" in the present specification.

Specifically, in low-speed trigger monitoring, the first trigger information which is trigger data is polled at a relatively slow cycle.

Since the cycle is relatively slow, it is difficult to detect changing edges of signals which change at a high speed.

Moreover, in the low-speed trigger monitoring, after the occurrence of an event in which the starting condition for acquisition of data is established is detected, high-speed sampling by the machine tool 20 and high-speed trigger monitoring by the data acquisition unit 114 of the data collection device 10 are performed.

That is, it is not possible to acquire data before occurrence of an event.

In a state of waiting for low-speed trigger, since the machine tool 20 does not perform high-speed sampling, the load of high-speed data collection is not applied to the machine tool 20.

Moreover, the communication load between the data collection device 10 and the machine tool 20 is low.

Here, the "first cycle" may be 500 ms to 1 s, for example, but there is no limitation thereto.

Hereinafter, the "first cycle" is also referred to as a "low-speed cycle".

Moreover, the "first trigger information" may be information related to at least one of a program number (O-number) and/or a program name of a program being executed by the machine tool 20, a PMC signal, a macro variable used in a program, and the number of data acquisition times.

Specifically, when the "first trigger information" is a program number and/or a program name of a program being executed by the machine tool 20, the event monitoring unit 112 monitors whether execution of a specific program has started or ended in the machine tool 20.

When the "first trigger information" is a PMC signal, the event monitoring unit 112 monitors whether the machine tool 20 has issued a specific PMC signal.

Specifically, the PMC signal may be a bit-type or value-type PMC signal indicating a tool number or the like selected by the machine tool 20.

When the "first trigger information" is a macro variable used in a program, the event monitoring unit 112 monitors whether a specific macro variable is used in a program being executed by the machine tool 20.

When the "first trigger information" is the number of data acquisition times, the event monitoring unit 112 monitors the number of data acquisition times from the machine tool 20 by the data acquisition unit 114.

Hereinafter, the "first trigger information" will be also referred to as "low-speed trigger".

The event monitoring unit 112 outputs a sampling start instruction signal to the sampling control unit 113 when it is determined from the low-speed trigger monitoring that a starting condition for acquisition of measurement target data by the data acquisition unit 114 is established.

On the other hand, the event monitoring unit 112 outputs a sampling end signal to the sampling control unit 113 when it is determined that an ending condition for acquisition of measurement data by the data acquisition unit 114 is established.

When the sampling start instruction signal is input from the event monitoring unit 112, the sampling control unit 113 instructs the machine tool 20 to start sampling of the measurement target data at a second cycle shorter than the first cycle.

Moreover, when the sampling end signal is input from the event monitoring unit 112, the sampling control unit 113 instructs the machine tool 20 to end sampling of the measurement data.

More specifically, when the starting condition for acquisition of data is established, the sampling control unit 113 notifies the machine tool 20 of a data acquisition target (a measurement target axis, a data type, and the like) and constructs a channel corresponding to the type of data to be acquired between the data acquisition unit 114 and the machine tool 20.

After that, the sampling control unit 113 instructs the machine tool 20 to start sampling.

Here, the "second cycle" may be 1 ms to 10 ms, for example, but there is no limitation thereto.

Hereinafter, the "second cycle" is also referred to as a high-speed cycle.

Moreover, the sampling start instruction from the sampling control unit 113 includes a trigger condition.

Here, the "trigger condition" is a condition for designating which type of measurement target data will be appended to sampling data as second trigger information when sampling the measurement target data by the machine tool 20.

More specifically, the "trigger condition" may be a condition for designating at least one of a sequence number included in a program being executed by the machine tool 20, a PMC signal, and an alarm from the machine tool 20 as the type of the second trigger information.

Hereinafter, the "second trigger information" will be also referred to as "high-speed trigger".

The data acquisition unit 114 acquires the sampling data from the machine tool 20 together with the second trigger information and stores the second trigger information in a buffer (not illustrated) included therein.

Furthermore, whether a storage condition for the data acquisition unit 114 to store sampling data in the database 120 is established is monitored on the basis of the second trigger information, and data for which the storage condition is established is stored in the database 120.

In the present specification, this monitoring will be referred to as "high-speed trigger monitoring".

Specifically, in the high-speed trigger monitoring, high-speed sampling data measured by the machine tool 20 is acquired (received) at a high speed via the network 30, and the data acquisition unit 114 monitors the second trigger information.

In the high-speed trigger monitoring, while waiting for a trigger, the machine tool 20 samples the measurement data and transmits the measurement data to the data collection device 10 via the network 30. Therefore, it is possible to acquire data before occurrence of a trigger event based on the "second trigger information".

Moreover, wince the cycle is relatively fast, it is possible to apply a trigger to signals which change at a high speed.

On the other hand, since the machine tool 20 and the data acquisition unit 114 of the data collection device 10 acquires data always during the high-speed trigger monitoring, the load on the data collection device 10 and the machine tool 20 is large.

Moreover, the "storage condition" is a condition for determining whether the sampling data acquired by the data acquisition unit 114 will be stored in the database 120 on the basis of the second trigger information.

Specifically, when the sequence number included in a program is used as the second trigger information, the "storage condition" may be a condition that the sampling data is stored in the database 120 when the sequence number of a step being executed in a program matches (or does not match) a sequence number set in advance.

Moreover, when a PMC signal is used as the second trigger information, the "storage condition" may be a condition that the sampling data is stored in the database 120 when the PMC signal output by the machine tool 20 matches (or does not match) a PMC signal set in advance.

Moreover, when a PMC signal used in a program code (hereinafter referred to as an M-code) that indicates a sequence operation is used as the second trigger information, the "storage condition" may be a condition that the sampling data is stored in the database 120 when a command being executed in a program matches (or does not match) a M-code (auxiliary function) set in advance.

Furthermore, when a signal (this will be referred to as a PMC signal of a position switch) that reacts when an axis has moved to a certain position is used as the second trigger information, the "storage condition" may be a condition that the sampling data is stored in the database 120 when a PMC signal of a position switch output when an arbitrary axis of the machine tool 20 enters a position within a specific range matches (or does not match) a signal set in advance.

Furthermore, when an alarm is used as the second trigger information, the "storage condition" may be a condition that the sampling data is stored in the database 120 when an alarm is output (or is not output) from the machine tool 20.

Furthermore, in the "storage condition", how many pieces of measurement data will be stored in the database 120 during one acquisition of measurement data by the data acquisition unit 114 may be set in advance.

Furthermore, in the "storage condition", how long the measurement data will be stored in the database 120 during one acquisition of measurement data by the data acquisition unit 114 may be set in advance.

Moreover, the data acquisition unit 114 may store the measurement data acquired from the machine tool 20 in the database 120 whenever the measurement data is acquired.

Moreover, at a time point when a predetermined number of pieces of data for which the storage condition is established are accumulated, the data acquired by that time point may be stored collectively in the database 120.

The database 120 is a database that stores the measurement data acquired by the data acquisition unit 114.

In the configuration of FIG. 2, although the database 120 is a component of the data collection device 10, the database 120 may be a device which is independent from the data collection device 10 and can communicate with the data collection device 10.

Figure 3:
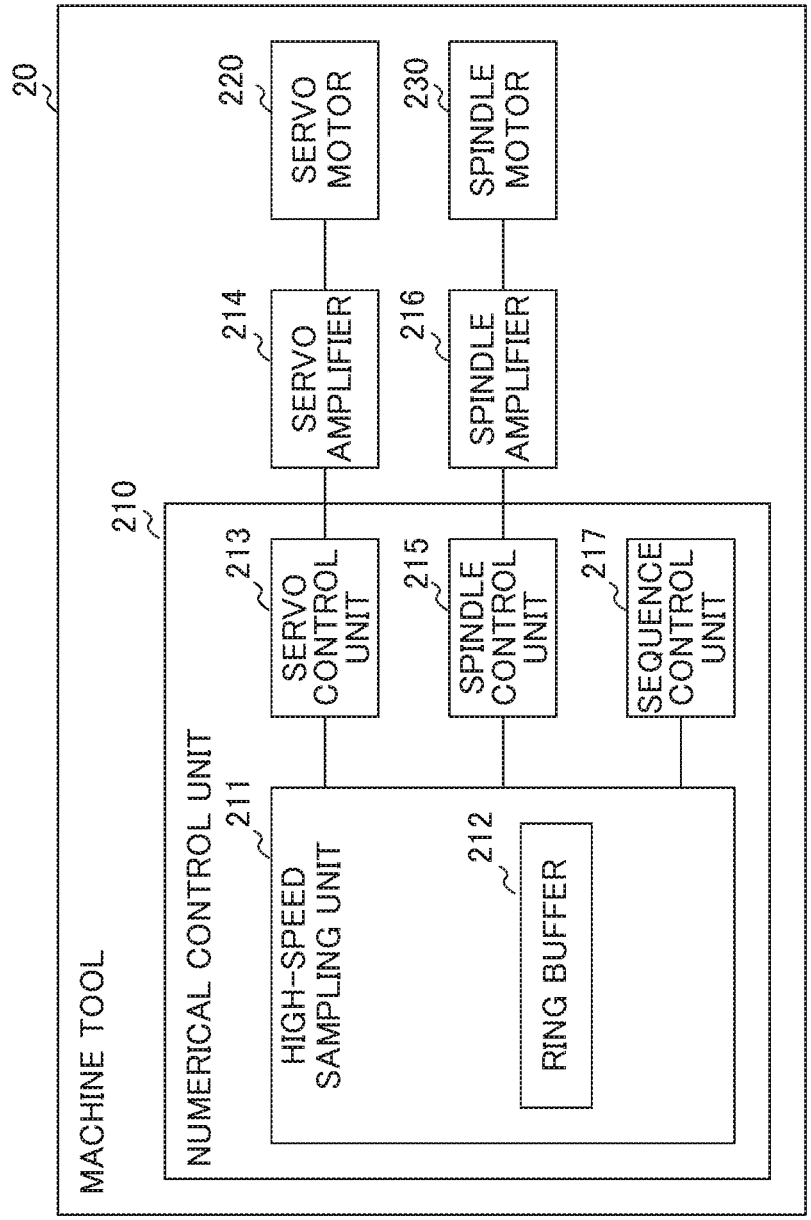
FIG. 3 is a functional block diagram of a machine tool according to an embodiment of the present invention.

FIG. 3 is an example of a functional block diagram of the machine tool 20.

In the example illustrated in FIG. 3, the machine tool 20 includes a numerical control unit 210, a servo amplifier 214, a servo motor 220, a spindle amplifier 216, and a spindle motor 230.

Furthermore, the numerical control unit 210 includes a high-speed sampling unit 211, a servo control unit 213, a spindle control unit 215, a sequence control unit 217, and the high-speed sampling unit 211 includes a ring buffer 212.

The numerical control unit 210 generates an operation command including a rotation command for the servo motor 220 driving respective axes and a rotation command for the spindle motor 230 driving a spindle on the basis of a machining program and transmits the generated operation command to the servo amplifier 214 and/or the spindle amplifier 216 with the aid of the servo control unit 213 and/or the spindle control unit 215 to thereby control the driving of the servo motor 220 and/or the spindle motor 230.

In this way, a predetermined machining operation of the machine tool 20 is realized.

More specifically, the servo control unit 210 outputs a movement command amount of each axis by the numerical control unit 210 to the servo amplifier 214, and the servo amplifier 214 drives the servo motor 220 of each axis in response to this command.

Similarly, the spindle control unit 215 outputs a movement command amount of the spindle by the numerical control unit 210 to the spindle amplifier 216, and the spindle amplifier 216 drives the spindle motor 230 of the spindle in response to this command.

The servo motor 220 of each axis and the spindle motor 230 of the spindle have a position and speed detector incorporated therein and feed a position and speed feedback signal from the position and speed detector back to the servo control unit 213 and/or the spindle control unit 215 to thereby perform feedback control of the position and the speed.

When a data acquisition target (a measurement target axis, a data type, and the like) is notified from the data collection device 10, the high-speed sampling unit 211 selects a measurement target axis and constructs a channel with the control unit of this axis (that is, the servo control unit 213 and/or the spindle control unit 215).

After that, the high-speed sampling unit 211 collects data measured by the servo control unit 213 and/or the spindle control unit 215, for example.

Upon receiving an instruction to start sampling from the data collection device 10, the high-speed sampling unit 211 stores the measurement data collected from the servo control unit 213 and/or the spindle control unit 215, for example, in the ring buffer 212 together with the second trigger information.

A data set stored in the ring buffer 212 has a data structure including data size information, second trigger information, and sampling data corresponding to one cycle.

The measurement data sampled by the high-speed sampling unit 211 may be waveform data and there is no limitation thereto.

In the example illustrated in FIG. 3, the high-speed sampling unit 211 samples data measured by the servo control unit 213 and/or the spindle control unit 215, but there is no limitation thereto.

For example, the high-speed sampling unit 211 may sample data measured by various sensors provided in the machine tool 20 and various sensors provided around the machine tool 20.

The data set stored in the ring buffer 212 is transmitted to the data collection device 10.

That is, the measurement data sampled by the high-speed sampling unit 211 is transmitted to the data collection device 10 via the network 30.

In the example illustrated in FIG. 3, the measurement data sampled by the high-speed sampling unit 211 is stored in the ring buffer 212, but there is no limitation thereto, and a buffer other than the ring buffer may be used.

The sequence control unit 217 outputs a PMC signal to an auxiliary device (for example, an actuator called a tool replacement robot hand) of the machine tool 20 via an I/O unit using a sequence program included in the numerical control unit 210 and controls the auxiliary device.

Moreover, the sequence control unit 217 receives signals of various switches of a control panel disposed in a main body of the machine tool 20, performs necessary signal processing on the signals, and delivers the processed signals to the numerical control unit 210.

As described above, the PMC signal is used for trigger information.

The machine tool illustrated in FIG. 3 is an example of the machine tool 20, and there is no limitation thereto.

The machine tool 20 may be a 5-axis machine tool or a 6-axis machine tool for example, and may be a forging machine or an injection molding machine.

Hereinabove, the configuration of the present invention has been described.

Next, an operation of the data collection system according to the present invention will be described.

2. Operation of Present Invention

Figure 4:
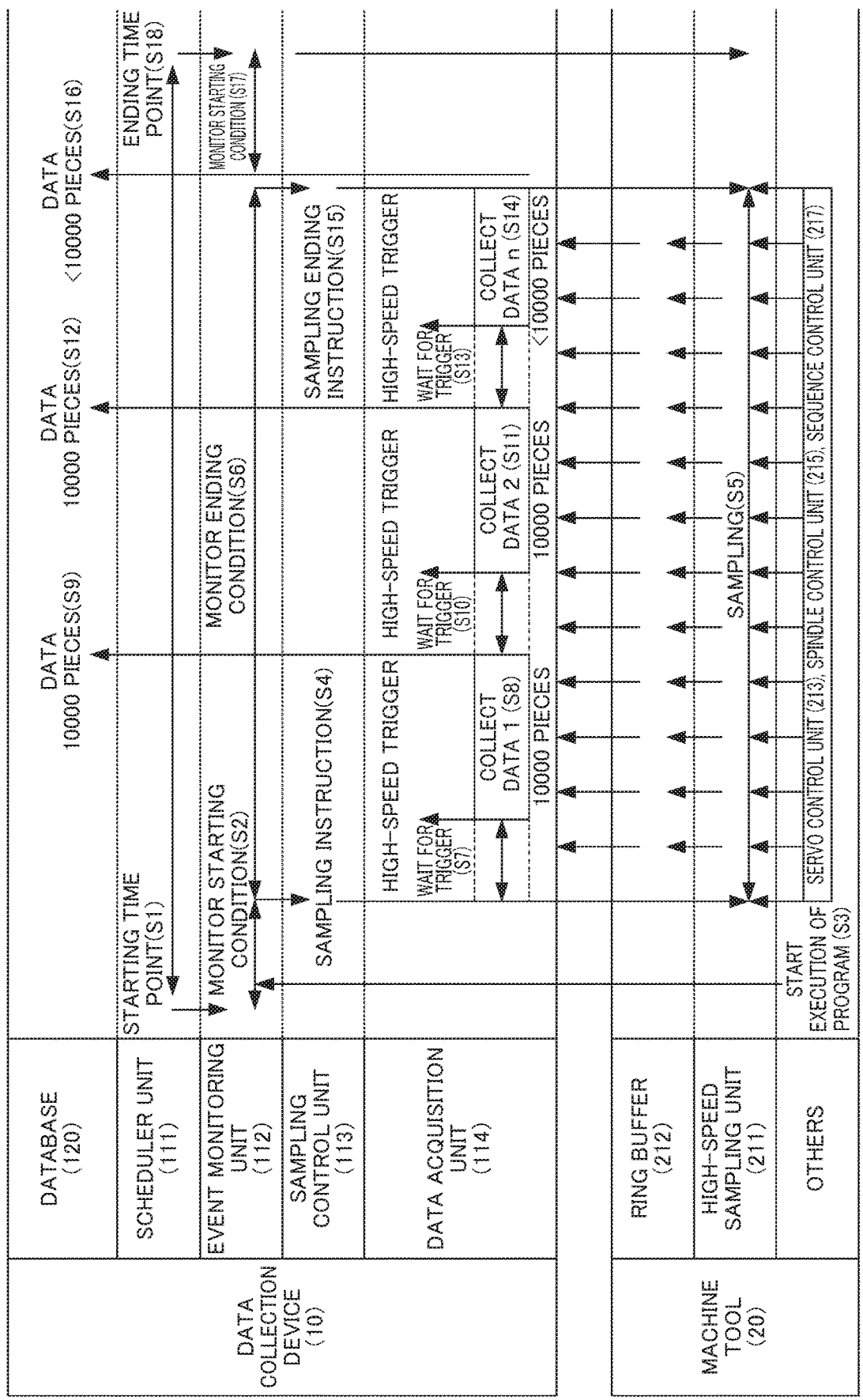
FIG. 4 is a diagram illustrating an operation of the data collection system according to the embodiment of the present invention.
Figure 5:
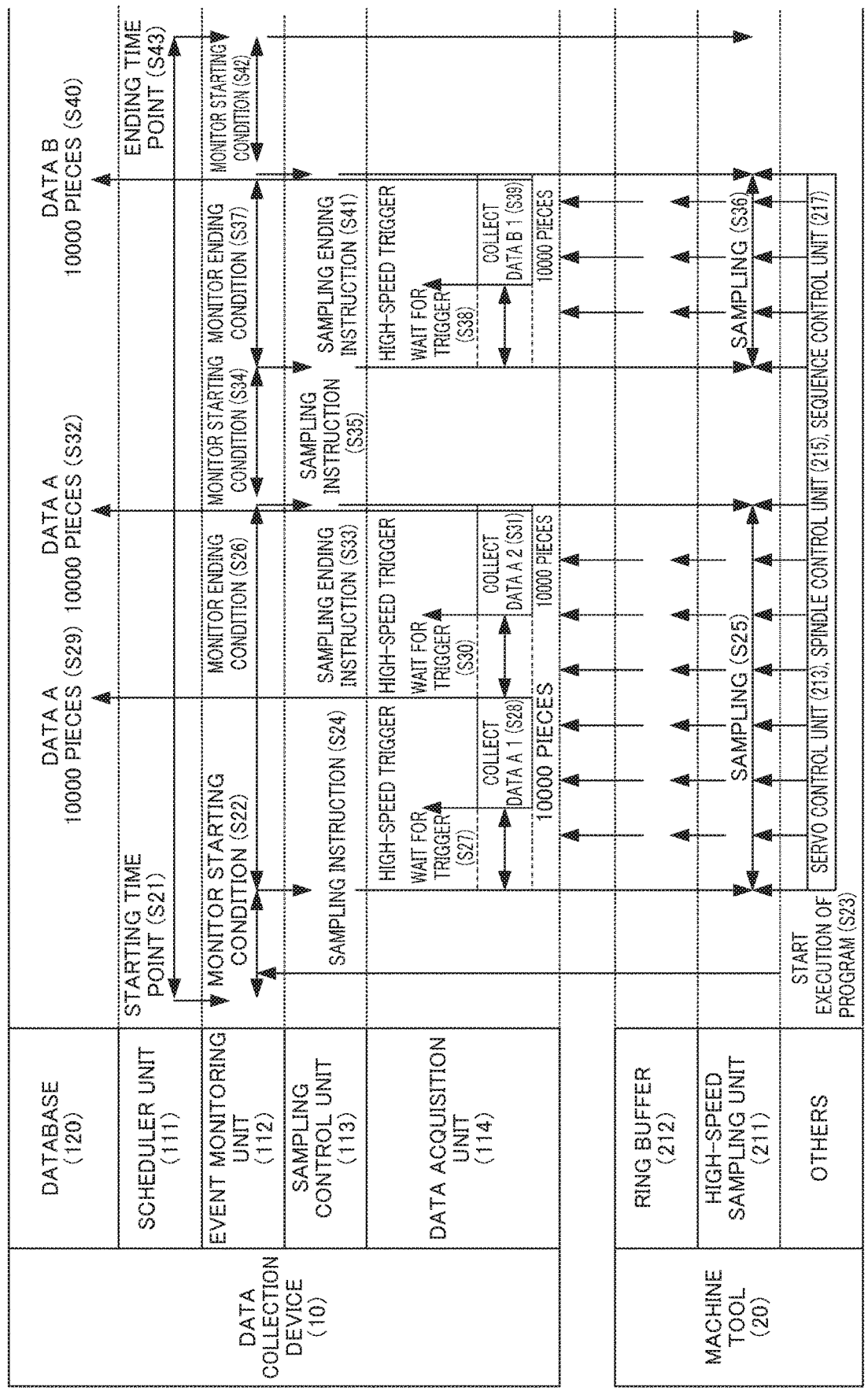
FIG. 5 is a diagram illustrating an operation of the data collection system according to the embodiment of the present invention.

FIGS. 4 to 6 are timing charts illustrating an operation example of the present invention.

The components of the data collection system 1 according to the present invention are listed to the left end of each drawing, and the time elapses in the direction from the left side of the drawing to the right side.

Arrows in the drawing indicate the flow of data and signals and the range of time.

Moreover, the additional characters starting with "S" used in the drawings correspond to the orders of respective operations in the following description.

2.1 Operation Example 1

FIG. 4 illustrates Operation Example 1 according to the embodiment of the present invention.

Operation Example 1 illustrates an example in which only one starting condition and one ending condition to be monitored by the event monitoring unit 112 of the data collection device 10 are present, and after storing of data in the database 120 by the data acquisition unit 114 is repeated, it is detected by the event monitoring unit 112 that the ending condition is established in the course of collection of data, whereby sampling by the machine tool 20 ends.

In S1, the scheduler unit 111 starts the operation of the event monitoring unit 112 since the present time point measured by the clock unit (not illustrated) matches the starting time point.

In S2, the event monitoring unit 112 starts monitoring whether the starting condition for acquisition of data is established on the basis of the first trigger information.

The starting condition is monitored at a low-speed cycle (a first cycle) of 500 ms to 1 s.

In Operation Example 1, a program number of a program executed by the machine tool 20 is illustrated as the first trigger information, but there is no limitation thereto.

For example, a bit-type or value-type PMC signal indicating a tool number selected by the machine tool 20 or a macro variable used in a program executed by the machine tool 20 may be used as the first trigger information.

In S3, the numerical control unit 210 executes a machining program, for example.

In S4, the event monitoring unit 112 detects that the program number of a program executed by the numerical control unit 210 is identical to the program number set in advance as the starting condition and outputs a sampling start instruction signal to the sampling control unit 113.

The sampling control unit 113 instructs the high-speed sampling unit 211 to start sampling data.

In S5, the high-speed sampling unit 211 executes sampling of the measurement target data from the servo control unit 213 and/or the spindle control unit 215 and acquires a PMC signal used for the trigger information from the sequence control unit 217.

In S6, the event monitoring unit 112 starts monitoring whether an ending condition for acquisition of data is established.

The first trigger information may be used for the ending condition, and the number of data acquisition times by the data acquisition unit 114 may be used.

The ending condition is monitored at a low-speed cycle (first cycle) of 500 ms to 1 s.

In S7, the data acquisition unit 114 monitors the second trigger information included in the data set acquired from the machine tool 20 and suspends the storage of measurement data until the storage condition is established.

It is noted that the second trigger information is monitored at a cycle of 1 ms to 10 ms.

Particularly, the cycle of monitoring the second trigger information may be the same as the cycle of sampling data or may be integer multiples of the cycle of sampling data.

In S8, since the storage condition based on the second trigger information is established, the data acquisition unit 114 stores the measurement data in the database 120. This data storage is referred to as first data storage.

In S9, since the number of pieces of data that the data acquisition unit 114 has stored in the database 120 has reached the number of pieces (in this example, 10000 pieces) set in advance in the storage condition, the data acquisition unit 114 ends storing the measurement data.

In S10, the data acquisition unit 114 monitors the second trigger information included in the data set acquired from the machine tool 20 and suspends storage of data until the storage condition is established.

In S11, since the storage condition based on the second trigger information is established, the data acquisition unit 114 stores the measurement data in the database 120.

This data storage is referred to as second data storage.

In S12, since the number of pieces of measurement data that the data acquisition unit 114 has stored in the database 120 has reached the number of pieces (in this example, 10000 pieces) set in advance in the storage condition, the data acquisition unit 114 ends storing the measurement data.

In S13, the data acquisition unit 114 monitors the second trigger information included in the data set acquired from the machine tool 20 and suspends storage of data until the storage condition is established.

In S14, since the storage condition based on the second trigger information is established, the data acquisition unit 114 stores the measurement data in the database 120.

This data storage will be referred to as n-th data storage.

In S15, the event monitoring unit 112 detects that the program number of a program executed by the numerical control unit 210 is identical to the program number set in advance as the ending condition and outputs a sampling end signal to the sampling control unit 113.

The sampling control unit 113 instructs the machine tool 20 to end sampling.

In this way, the high-speed sampling unit 211 ends sampling.

In S16, the data acquisition unit 114 stores a number of pieces of measurement data smaller than the number of pieces (in this example, 10000 pieces) set in advance in the storage condition in the database 120 and ends storing the measurement data.

In S17, the event monitoring unit 112 resumes monitoring whether the starting condition for acquisition of data is established on the basis of the first trigger information.

In S18, the scheduler unit 111 ends the operation of the event monitoring unit 112 since the present time point measured by the clock unit (not illustrated) matches the ending time point.

Moreover, the sampling control unit 113 removes the channel constructed between the data acquisition unit 114 and the machine tool 20 in order to acquire data.

2.2 Operation Example 2

FIG. 5 illustrates Operation Example 2 according to the embodiment of the present invention.

In Operation Example 2, a first starting condition and a second starting condition are present as the starting condition for acquisition of data that the event monitoring unit 112 of the data collection device 10 monitors, and a first ending condition and a second ending condition corresponding to the first starting condition and the second starting condition are present as the ending condition for acquisition of data.

When the first starting condition is established, the event monitoring unit 112 starts acquiring measurement data A corresponding to the first starting condition, suspends monitoring the second starting condition, and monitors the first ending condition only.

When the second starting condition is established, the event monitoring unit 112 starts acquiring measurement data B corresponding to the second starting condition, suspends monitoring the first starting condition, and monitors the second ending condition only.

In S21, the scheduler unit 111 starts the operation of the event monitoring unit 112 since the present time point measured by the clock unit (not illustrated) matches the starting time point.

In S22, the event monitoring unit 112 starts monitoring whether a starting condition for acquisition of data is established on the basis of the first trigger information.

It is noted that the starting condition herein includes the first starting condition corresponding to the measurement target data A and the second starting condition corresponding to the measurement target data B.

In S23, the numerical control unit 210 executes a machining program, for example.

In S24, the event monitoring unit 112 detects that the program number of a program executed by the numerical control unit 210 is identical to the program number set in advance as the first starting condition and outputs a sampling start instruction signal to the sampling control unit 113.

The sampling control unit 113 instructs the machine tool 20 to start sampling the measurement target data A.

In S25, the high-speed sampling unit 211 executes sampling of the measurement target data A from the servo control unit 213 and/or the spindle control unit 215 and acquires a PMC signal used for the trigger information from the sequence control unit 217.

In S26, the event monitoring unit 112 starts monitoring whether the first ending condition which is an ending condition for acquisition of the measurement data A is established.

The first trigger information may be used for the ending condition, and the number of data acquisition times by the data acquisition unit 114 may be used.

In this example, a case in which the first ending condition is that the number of acquisition times of the measurement data A by the data acquisition unit 114 has reached two times is illustrated.

In S27, the data acquisition unit 114 monitors the second trigger information included in the data set acquired from the machine tool 20 and suspends the storage of measurement data until the storage condition is established.

In S28, since the storage condition based on the second trigger information is established, the data acquisition unit 114 stores the measurement data A in the database 120.

It is noted that this data storage is referred to as first storage of the measurement data A.

In S29, since the number of pieces of data that the data acquisition unit 114 has stored in the database 120 has reached the number of pieces (in this example, 10000 pieces) set in advance in the storage condition, the data acquisition unit 114 ends storing the measurement data.

In S30, the data acquisition unit 114 monitors the second trigger information included in the data set acquired from the machine tool 20 and suspends storage of data until the storage condition is established.

In S31, since the storage condition based on the second trigger information is established, the data acquisition unit 114 stores the measurement data A in the database 120.

It is noted that this data storage is referred to as second storage of the measurement data A.

In S32, since the number of pieces of data that the data acquisition unit 114 has stored in the database 120 has reached the number of pieces (in this example, 10000 pieces) set in advance in the storage condition, the data acquisition unit 114 ends storing the measurement data A.

In S33, the event monitoring unit 112 detects that the first ending condition that the number of acquisition times of the measurement data A by the data acquisition unit 114 has reached two times has been established and outputs a sampling end signal to the sampling control unit 113.

The sampling control unit 113 instructs the machine tool 20 to end sampling the measurement target data A.

In this way, the high-speed sampling unit 211 ends sampling.

In S34, the event monitoring unit 112 starts monitoring whether a starting condition for acquisition of data is established on the basis of the first trigger information.

It is noted that the starting condition herein includes the first starting condition corresponding to the measurement target data A and the second starting condition corresponding to the measurement target data B.

In S35, the event monitoring unit 112 detects that the program number of a program executed by the numerical control unit 210 is identical to the program number set in advance as the second starting condition and outputs a sampling start instruction signal to the sampling control unit 113.

The sampling control unit 113 instructs the machine tool 20 to start sampling the measurement data B.

In S36, the high-speed sampling unit 211 executes sampling of the measurement target data B from the servo control unit 213 and/or the spindle control unit 215 and acquires a PMC signal used for the trigger information from the sequence control unit 217.

In S37, the event monitoring unit 112 starts monitoring whether the second ending condition which is an ending condition for acquisition of the measurement data B is established.

The first trigger information may be used for the ending condition, and the number of data acquisition times by the data acquisition unit 114 may be used.

In this example, a case in which the first ending condition is that the number of acquisition times of the measurement data B by the data acquisition unit 114 has reached one time is illustrated.

In S38, the data acquisition unit 114 monitors the second trigger information included in the data set acquired from the machine tool 20 and suspends the storage of the measurement data B until the storage condition is established.

In S39, since the storage condition based on the second trigger information is established, the data acquisition unit 114 stores the measurement data B in the database 120.

It is noted that this data storage is referred to as first storage of the measurement data B.

In S40, since the number of pieces of measurement data B that the data acquisition unit 114 has stored in the database 120 has reached the number of pieces (in this example, 10000 pieces) set in advance in the storage condition, the data acquisition unit 114 ends storing the measurement data.

In S41, the event monitoring unit 112 detects that the second ending condition that the number of acquisition times of the measurement data B by the data acquisition unit 114 has reached one time has been established and outputs a sampling end signal to the sampling control unit 113.

The sampling control unit 113 instructs the machine tool 20 to end sampling the measurement target data B.

In this way, the high-speed sampling unit 211 ends sampling.

In S42, the event monitoring unit 112 starts monitoring whether a starting condition for acquisition of data is established on the basis of the first trigger information.

It is noted that the starting condition herein includes the first starting condition corresponding to the data A and the second starting condition corresponding to the data B.

In S43, the scheduler unit 111 ends the operation of the event monitoring unit 112 since the present time point measured by the clock unit (not illustrated) matches the ending time point.

Moreover, the sampling control unit 113 removes the channel constructed between the data acquisition unit 114 and the machine tool 20 in order to acquire data.

It is noted that, in Operation Example 2, during sampling of the measurement target data A by the high-speed sampling unit 211, the event monitoring unit 112 does not monitor whether the second starting condition has been established. Similarly, during sampling of the measurement target data B by the high-speed sampling unit 211, the event monitoring unit 112 does not monitor whether the first starting condition has been established.

2.3 Operation Example 3

FIG. 6 illustrates Operation Example 3 according to the embodiment of the present invention.

Operation Example 3 illustrates an example in which the data acquisition unit 114 of the data collection device 10 does not perform high-speed trigger monitoring using the second trigger information, but the measurement data transmitted from the machine tool 20 is stored in the database 120 unconditionally.

In S51, the scheduler unit 111 starts the operation of the event monitoring unit 112 since the present time point measured by the clock unit (not illustrated) matches the starting time point.

In S52, the event monitoring unit 112 starts monitoring the starting condition for acquisition of data has been established on the basis of the first trigger information.

In S53, the numerical control unit 210 executes a machining program, for example.

In S54, the event monitoring unit 112 detects that the program number of a program executed by the numerical control unit 210 is identical to the program number set in advance as the starting condition and outputs a sampling start instruction signal to the sampling control unit 113.

The sampling control unit 113 instructs the high-speed sampling unit 211 to start sampling data.

In S55, the high-speed sampling unit 211 executes sampling of the measurement target data from the servo control unit 213 and/or the spindle control unit 215 and acquires a PMC signal used for the trigger information from the sequence control unit 217.

Furthermore, the data acquisition unit 114 stores the measurement data in the database 120 without monitoring the second trigger information.

This data storage is referred to as first data storage.

In S56, the event monitoring unit 112 starts monitoring the ending condition for acquisition of data.

The first trigger information may be used for the ending condition, and the number of data acquisition times by the data acquisition unit 114 may be used.

In this example, a case in which the first ending condition is that the number of acquisition times of the measurement data by the data acquisition unit 114 has reached one time is illustrated.

In S57, since the number of pieces of data that the data acquisition unit 114 has stored in the database 120 has reached the number of pieces (in this example, 10000 pieces) set in advance in the storage condition, the data acquisition unit 114 ends storing the measurement data.

In S58, the event monitoring unit 112 detects that the ending condition that the number of acquisition times of the measurement data by the data acquisition unit 114 has reached one time has been established and outputs a sampling end signal to the sampling control unit 113.

The sampling control unit 113 instructs the machine tool 20 to end sampling.

In this way, the high-speed sampling unit 211 ends sampling.

In S59, the event monitoring unit 112 starts monitoring whether a starting condition for acquisition of data is established on the basis of the first trigger information.

In S60, the scheduler unit 111 ends the operation of the event monitoring unit 112 since the present time point measured by the clock unit (not illustrated) matches the ending time point.

Moreover, the sampling control unit 113 removes the channel constructed between the data acquisition unit 114 and the machine tool 20 in order to acquire data.

3. Advantages of Embodiment

According to the data collection system 1 of the embodiment of the present invention, it is possible to reduce the load of a data collection process and network communication and collect data reliably without skipping portions where data measurement is necessary by using a combination of a first trigger determination unit that determines starting/ending of high-speed sampling at a low-speed cycle and a second trigger determination unit that determines the storage of high-speed sampling data.

Moreover, it is possible to provide a plurality of types of starting conditions and ending conditions for acquisition of data, monitor a plurality of starting conditions simultaneously, and collect measurement data of a type corresponding to an established starting condition.

4. Modification

In the present embodiment, although the database 120 is a component of the data collection device 10, there is no limitation thereto.

The database 120 may be provided in a device which is independent from the data collection device 10 and can communicate with the data collection device 10, for example.

EXPLANATION OF REFERENCE NUMERALS

1: Data collection system
10: Data collection device
20: Machine tool
30: Network
110: Control unit
111: Scheduler unit
112: Event monitoring unit
113: Sampling control unit
114: Data acquisition unit
120: Database
210: Numerical control unit
211: High-speed sampling unit
212: Ring buffer
213: Servo control unit
214: Servo amplifier
215: Spindle control unit
216: Spindle amplifier
217: Sequence control unit
220: Servo motor
230: Spindle motor

What is claimed is:

1. A data collection device that collects data from a machine tool, the data collection device comprising:
a memory; and
a processor, wherein
the processor is configured to:
acquire first trigger information from the machine tool at a first cycle and monitor whether a starting condition and an ending condition for acquisition of the data have been established on the basis of the first trigger information;
instruct the machine tool to start sampling the data at a second cycle shorter than the first cycle when the starting condition is established and instruct the machine tool to end the sampling when the ending condition is established;
acquire the data sampled by the machine tool from the machine tool together with second trigger information; and
monitor whether or not a storage condition for the data has been established on the basis of the second trigger information, store the data in a database when the storage condition has been established, and terminate the storage of the data when the storage condition is no longer established,
a number of the data is set in the storage condition, and
the ending condition is based on the first trigger information or a number of times of data acquisition.

2. The data collection device according to claim 1, wherein
a plurality of starting conditions are present,
the processor monitors the plurality of starting conditions simultaneously, and
the processor instructs the machine tool to sample the data of a type corresponding to an established one of the plurality of starting conditions.

3. The data collection device according to claim 1, wherein
the first cycle is 500 ms to 1 s and the second cycle is 1 ms to 10 ms.

4. The data collection device according to claim 1, wherein
the first trigger information is information related to at least one of a program number and/or a program name of a program being executed by the machine tool, a tool number being used by the machine tool, or a variable designated in the program and used for control.

5. The data collection device according to claim 1, wherein
the second trigger information is information related to at least one of a sequence number included in a program being executed by the machine tool, a sequence signal on which sequence control is performed, or an alarm from the machine tool.

6. The data collection device according to claim 1, wherein
the processor acquires a data set including the data from the machine tool and stores the data set in a buffer.

7. The data collection device according to claim 6, wherein
the data set has a data structure including data size information, the second trigger information, and sampling data corresponding to one cycle.

8. The data collection device according to claim 1, wherein
the processor is further configured to:
set a starting time point and an ending time point for monitoring whether the starting condition and the ending condition have been established, start the monitoring of whether the starting condition and the ending condition have been established when a present time point matches the starting time point, and end the monitoring of whether the starting condition and the ending condition have been established when the present time point matches the ending time point.

* * * * *